US008967166B2

(12) United States Patent
Esposito

(10) Patent No.: US 8,967,166 B2
(45) Date of Patent: Mar. 3, 2015

(54) ROTARY DRUM WASHER FOR STREET SWEEPING WASTE AND CONTAMINATED SOIL

(71) Applicant: Ecocentro Tecnologie Ambientali S.p.A., Gorle (IT)

(72) Inventor: Ezio Esposito, Cene (IT)

(73) Assignee: Ecocentro Tecnologie Ambientali S.p.A., Gorle (IT)

( * ) Notice: Subject to any disclaimer, the term of this patent is extended or adjusted under 35 U.S.C. 154(b) by 0 days.

(21) Appl. No.: 14/371,419

(22) PCT Filed: Feb. 1, 2013

(86) PCT No.: PCT/IB2013/050873
§ 371 (c)(1),
(2) Date: Jul. 9, 2014

(87) PCT Pub. No.: WO2013/128310
PCT Pub. Date: Sep. 6, 2013

(65) Prior Publication Data
US 2015/0000715 A1 Jan. 1, 2015

(30) Foreign Application Priority Data
Feb. 16, 2012 (IT) .............................. MI2012A0225

(51) Int. Cl.
*B08B 3/04* (2006.01)
*B08B 3/02* (2006.01)
(Continued)

(52) U.S. Cl.
CPC . *B08B 3/042* (2013.01); *B08B 3/02* (2013.01); *B08B 3/044* (2013.01); *B08B 3/06* (2013.01); *B03B 5/56* (2013.01); *B07B 1/24* (2013.01); *B09C 1/02* (2013.01)
USPC ...................................... 134/120

(58) Field of Classification Search
None
See application file for complete search history.

(56) References Cited

U.S. PATENT DOCUMENTS 5,190,649 A * 3/1993 Celi .............................. 210/178
8,381,916 B2 * 2/2013 Bossen ......................... 209/288

FOREIGN PATENT DOCUMENTS

DE 3535260 9/1987
EP 1775267 4/2007
(Continued)

OTHER PUBLICATIONS
PCT International Search Report mailed on Jun. 26, 2013 for PCT/IB2013/050873 filed on Feb. 1, 2013 in the name of Ecocentro Tecnologie Ambientali S.P.A.
(Continued)

*Primary Examiner* — Michael Barr
*Assistant Examiner* — Rita Adhlakha
(74) *Attorney, Agent, or Firm* — Steinfl & Bruno, LLP

(57) ABSTRACT

A horizontal rotary drum in which the materials to be treated are introduced through a feed hopper together with a water flow admitted through treatment nozzles so as to form a suspension of water and materials is described. The horizontal rotary drum has inclined paddles that move forward the heavy materials deposited on the bottom of the drum towards an exit end where an extractor conveys them towards concentric screening means, a stop ring being arranged transversally inside the drum so as to leave only a peripheral annular passage having a height lower than the level of the suspension of water and materials present on the bottom of the drum so as to stop the lighter organic contaminants that are in the upper part of the suspension. Means for slightly inclining the axis of the rotary drum within a small angular interval, as well as with clod-breaking teeth for treating clayey materials are also described.

10 Claims, 2 Drawing Sheets

(51) Int. Cl.
 B09C 1/02 (2006.01)
 B08B 3/06 (2006.01)
 B03B 5/56 (2006.01)
 B07B 1/24 (2006.01)

(56) References Cited

FOREIGN PATENT DOCUMENTS

| FR | 815672 | 12/1936 |
| GB | 464650 | 4/1937 |
| GB | 1237863 | 6/1971 |

OTHER PUBLICATIONS

PCT Written Opinion mailed on Jun. 26, 2013 for PCT/IB2013/050873 filed on Feb. 1, 2013 in the name of Ecocentro Tecnologie Ambientali S.P.A.

PCT International Preliminary Report on Patentability mailed on Feb. 28, 2014 for PCT/IB2013/050873 filed on Feb. 1, 2013 in the name of Ecocentro Tecnologie Ambientali S.P.A.

* cited by examiner

ROTARY DRUM WASHER FOR STREET SWEEPING WASTE AND CONTAMINATED SOIL

CROSS REFERENCE TO RELATED APPLICATIONS

The present application is the US national stage of International Patent Application PCT/EP2013/050873 filed on Feb. 1, 2013 which, in turn, claims priority to Italian Patent Application MI2012A000225 filed on Feb. 16, 2012.

The present invention relates to a washer with a horizontal rotary drum and in particular to a washer for plants for the disposal and recovery of wastes resulting from street sweepings and cleaning up of contaminated soils. A similar machine is described in Italian patent n.1349786 of which the present application constitutes a refinement and the contents of which are incorporated herein by reference.

The wash processes in said disposal plants generally comprise various steps such as the transfer of pollutants from the particles of material to water, the separation of the particles of solid pollutant substances by means of selection processes, the removal by means of chemical and physical processes of the pollutants transferred from the particles to water, the concentration of pollutants in the silt and the separation of silt from the recovered materials, the chemical-physical treatment of the slurry containing the silt and the pollutants and the recycling of treated water, possibly after biological treatment, if necessary. An example of such a plant devised by the same inventor of the present application is disclosed in EP 1775267.

The washer described in the above-mentioned Italian patent allows to obtain various products of separation and thus to combine several machines in a single machine thereby reducing the number of machines present in the wash plant with consequent economic advantages, both from the point of view of the installation and of the energy consumption. This machine also allows to obtain a good separation of the organic substances with a particle size typically between 2 and 40 mm, and consequently a greater quality of the recovered materials.

More specifically, this machine effectively performs the counter-current washing of materials and wastes having a mainly sandy composition and effectively removes organic contaminants such as leaves, paper, wood, plastic, etc. whereby it is very suitable for the wash and recovery of wastes resulting from street sweepings, allowing to recover sand, granule and gravel so that these materials are in compliance with all regulations of the specific sector of reuse. Moreover, the above machine is able to wash materials and/or wastes which contain pieces up to about 150 mm in size without the need for a pre-screening, and also includes the screens for the classification of the recovered materials.

The inventor has however developed some refinements to increase the effectiveness of the machine as regards the removal of pollutants, in particular of organic nature, the wash of the recovered material and the treatment of materials and/or wastes comprising clay clods. For this last aspect, in particular, the current version of the machine is not able to guarantee a good breaking and crushing of the clods, so that the lumps of clay, in which generally most of the pollutants are concentrated, end up among the recovered materials thus degrading their quality.

The present refinements allow to further reduce the number of machines present in the wash plant disclosed in the above-mentioned European patent in which the waste water leaving the horizontal barrel washer has to be further treated in a collection tank, a hydrocyclone, a friction cell and a vertical spirals separator to achieve proper cleaning of the sand particles and separation of the fine organic materials <2 mm.

Horizontal barrel washers for the counter-current washing of solids are already known also from other industrial fields but are unsuitable for the disposal and recovery of wastes as mentioned above since they are designed for different purposes and operate in a different manner. For example, GB 1237863 discloses an apparatus especially useful in the extraction of sucrose from sugar cane or sugar beet by counter-current washing with water or a dilute sucrose solution, yet also applicable to the washing of sand and gravel. Such an apparatus consists of a cylindrical or polygonal drum divided along its length into a plurality of compartments by a plurality of discoid members each having a central aperture, each compartment itself being divided into a plurality of pockets by at least three flights extending between said members and so positioned that each pocket opens into a space extending along the longitudinal axis of the drum and bounded by the apertures of said discoid members, with means for supplying particulate solid material to one end of the drum and receiving it from the other end of the drum, and means for supplying liquids in the opposite direction. The material is divided into batches by the pockets in the compartment and, as the drum revolves, each of these batches is lifted around the circumference of the drum by the flights fixed in the compartment and then at some point will slide off its supporting flight and fall again to the bottom of the drum.

Since the discoid members are connected to the drum along the whole internal periphery thereof, the movement of the solid material towards the exit end is obtained by making the discoid members dished, so that they have a frusto-conical shape pointing towards that end of the drum, whereby when a batch of material has been carried up by a flight in a compartment and reaches the point where it starts to slide off that flight, the slope of the dished discoid members will tend to give it a component of momentum along the axis of the drum so that the batch tends to fall into a compartment nearer the exit end of the drum. Alternatively, separate impeller means may be provided in the space along the longitudinal axis of the drum bounded by the central apertures of the discoid members, such as an array of baffles or an helical screw mounted on external supports and extending through the open space along the centre of the drum.

However, neither of these known arrangements is suitable to perform an effective wash and recovery of the waste materials as the washer of the present invention since, for example, the apparatus disclosed in the above-mentioned British patent has no means to separate the light organic materials from the heavy materials and the liquid is discharged from the apparatus either through bottom cocks or a perforated end discoid member. Therefore such a washer not only does not separate the light organic materials but could not even discharge them through the material loading end as the washer disclosed hereafter does.

The purpose of the present invention is therefore to provide a washer with a rotary drum that overcomes the limitations of prior art washers. Said object is achieved by means of a machine provided with a separator ring and a dedicated nozzle for the counter-current washing of the organic contaminants, with means for adjusting the inclination of the machine and with clod-breaking teeth.

A first important advantage of the washer according to the present invention is that of performing a better separation of the light organic contaminants, so that even when treating wastes resulting from street sweepings that contain a significant amount of such contaminants (e.g. the leaves in autumn)

the recovered materials are readily usable without having to further wash them to remove the residual organic contaminants.

A second significant advantage of this machine lies in its greater wash effectiveness obtained by slightly raising the recovered materials delivery end in such a way that in the end region of the wash cylinder the materials are subjected to a more energetic wash, due to the lower water/waste ratio caused by the inclination of the machine, similar to that obtainable in an attrition cell.

Yet another advantage of this machine is the presence of clod-breaking teeth that allow to break and crush adequately even clayey materials so as to remove the contaminants contained therein and to obtain recovered materials of better quality.

Further advantages and characteristics of the washer according to the present invention will become apparent to those skilled in the art from the following detailed and non-limiting description of some embodiments thereof with reference to the accompanying drawings in which.

Figure 1:
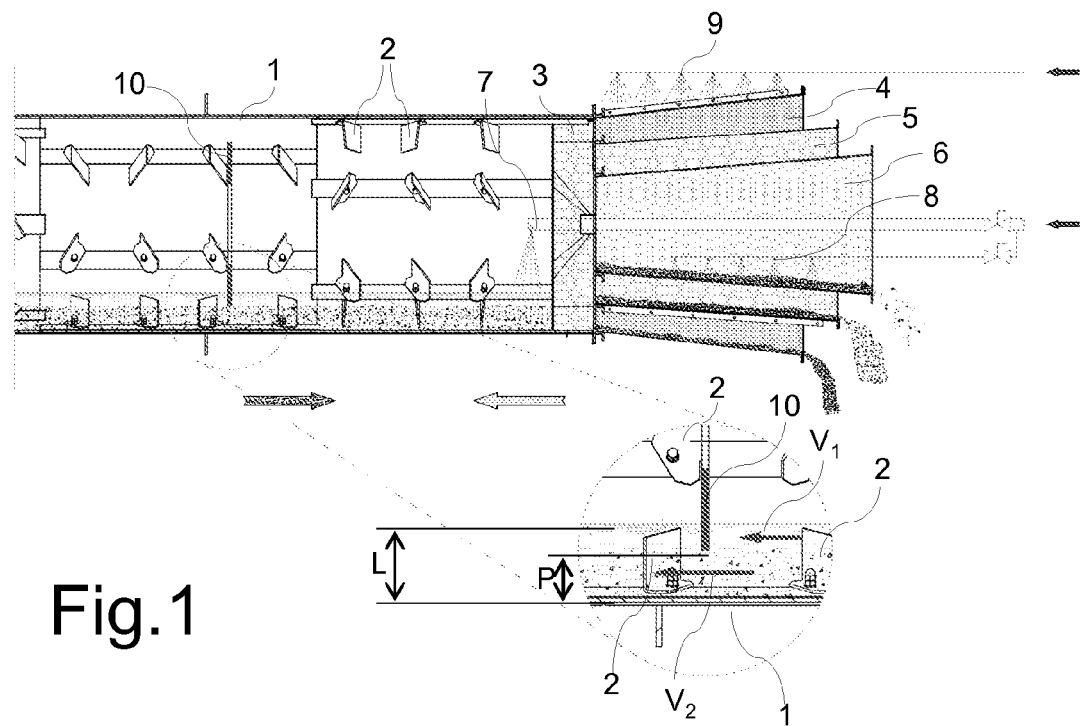
FIG. 1 is a partial schematic view in longitudinal section of a first embodiment of the washer, with an enlarged detail.
Figure 2:
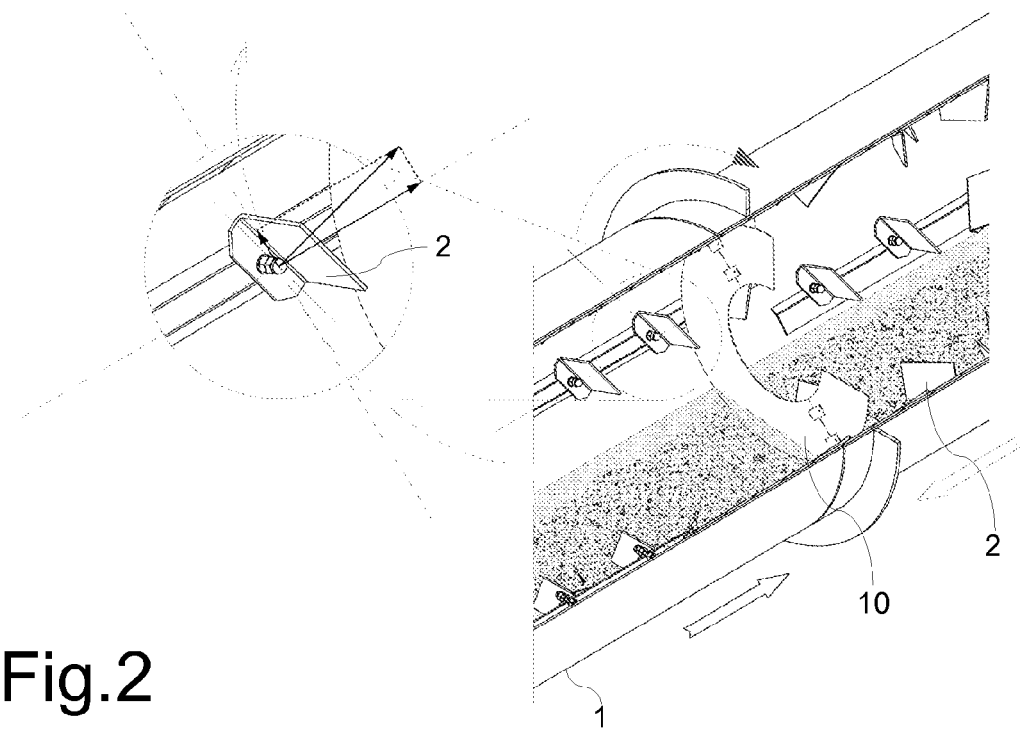
FIG. 2 is a cutout perspective view of the machine of FIG. 1, with an enlarged detail.

With reference to FIGS. 1 and 2, there is seen that a washer according to the present invention comprises a horizontal rotary drum 1 in which the materials to be treated are introduced through an inlet (not shown) together with a flow of water introduced through nozzles. Inclined paddles 2 are arranged inside drum 1 to move forward (according to the diagram of the forces indicated in the detail of FIG. 2) the heavy materials deposited on the bottom of drum 1 towards an exit end where an extractor 3 conveys them towards concentric screening means.

Three conical screening means are provided in the illustrated embodiment, namely an external screen 4, an intermediate screen 5 and an internal screen 6 which are made from metal sheets provided with holes of increasing size. The present washer also comprises a nozzle 7, immediately upstream from extractor 3, for the admission of water for the counter-current washing of the treated materials, as well as nozzles 8 and 9 to wash the internal screen 6 and the external screen 4 respectively.

A first novel aspect of the machine according to the present invention is the presence of a stop ring 10 arranged transversally inside drum 1 so as to leave only a peripheral annular passage P having a height lower than the level L of the suspension of water and materials present on the bottom of drum 1. For simplicity, the stop ring 10 is secured directly on some paddles 2 but it is clear that it could be mounted in drum 1 by means of suitable supports.

The insertion of the stop ring 10 allows to substantially improve the separation of organic contaminants from the recovered materials because while the recoverable heavy materials lie on the bottom of drum 1 and are pushed forward by paddles 2 (as known e.g. from GB 464650), in counter-current with respect to the flow of wash water admitted through nozzle 7, the lighter organic contaminants are in the upper part of the suspension and are intercepted and rejected by the stop ring 10.

These contaminants are then carried away in counter-current by the water flowing to the inlet of drum 1, from where they overflow onto a vibrating screen, the dragging effect of the counter-current water being also made more effective by the fact that ring 10 reduces the water passage section from L to P whereby, in correspondence with ring 10, the flow of water in counter-current increases its speed and drags better the organic contaminants (i.e. $V_2 > V_1$ in the detail of FIG. 1).

Figure 3:
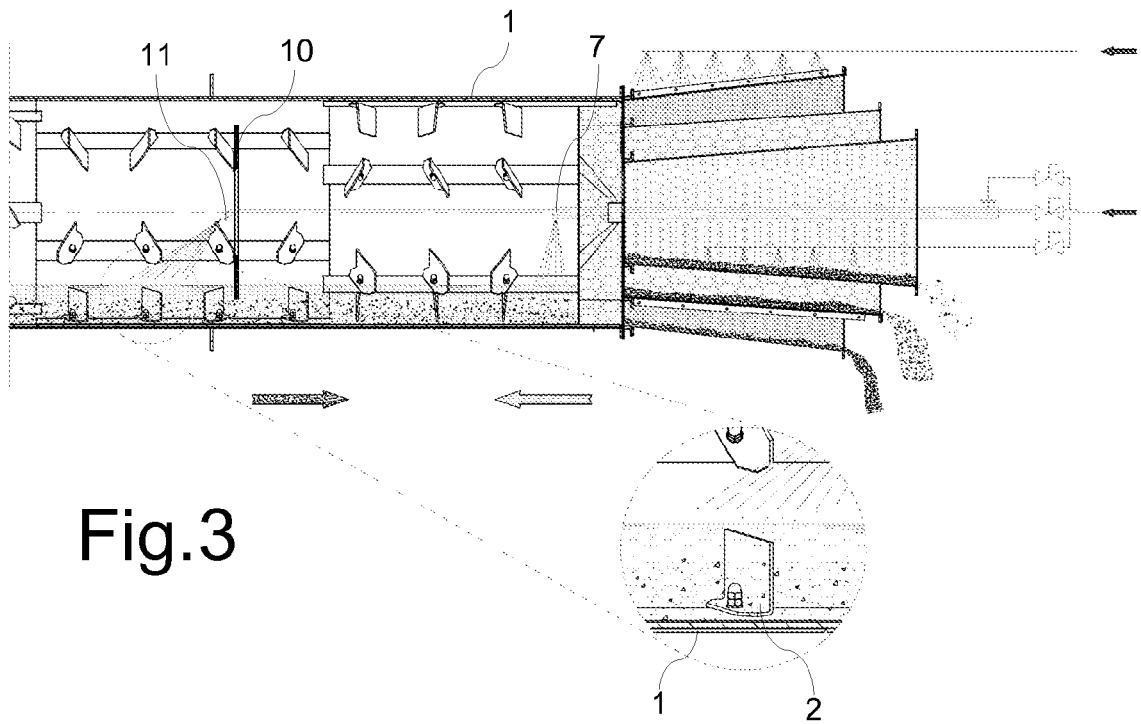
FIG. 3 is a view similar to FIG. 1 of a second embodiment of the machine, with an enlarged detail.

In the second embodiment shown in FIG. 3, this effect of separation and dragging of the organic contaminants is further improved by the presence of a second nozzle 11 arranged immediately upstream from ring 10 for the admission of a second flow of water in counter-current. This second nozzle 11 is preferably inclined at about 45° and designed to emit a fan-shaped jet, and it is fed through a pipe that passes through the central opening of ring 10 and is coaxial with the pipe that feeds the first nozzle 7. It should be noted that in the absence of this second nozzle 11, as in the first embodiment, ring 10 could also be devoid of a central opening, i.e. a solid disc.

Figure 4:
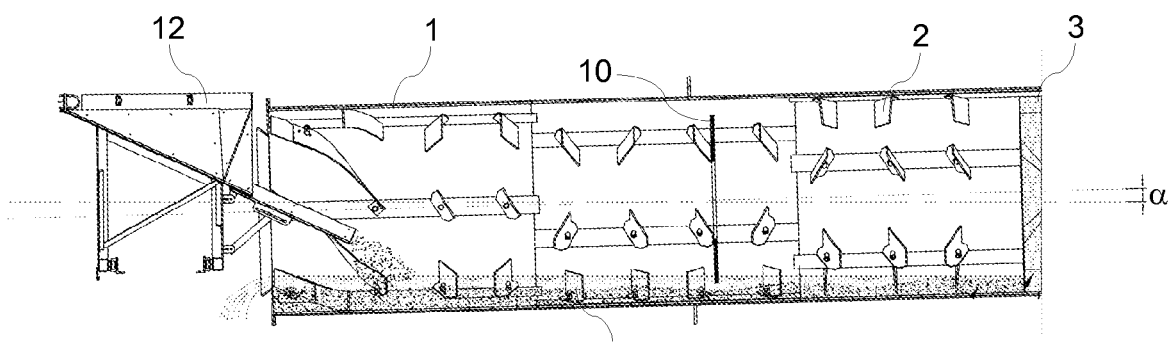
FIG. 4 is a partial schematic view in longitudinal section of a third embodiment of the machine.

A further innovative aspect of the present machine is illustrated in the third embodiment of FIG. 4 which provides means to slightly incline the axis of drum 1, within a small angular interval a, indicatively to obtain a maximum slope of 2-3% in the direction of the recovered materials exit, i.e. towards the concentric screens. The means which regulate the inclination of drum 1 may be hydraulic jacks, mechanical screw lifters or other equivalent means well known to a person skilled in the art.

In a conventional machine the rotary drum 1 rotates horizontally around its own axis with a constant speed thus creating, together with nozzle 7 and paddles 2, a turbulent mixing of the materials continuously loaded through a hopper 12. In other words, it creates a continuous and vigorous stirring of the suspension of materials and water which causes the washing of the materials by mutual friction of the particles.

An attrition cell consists of a tank in which agitators cause a strong stirring of the materials that, due to their impact and rubbing between them and against the walls of the cell itself, are effectively washed. These mechanisms of impact and rubbing between the materials contained in the cell and against the cell itself allow to release even the contaminants more strongly bound to the surface of the materials or contained in agglomerates of the materials themselves.

A basic condition for the effectiveness of the wash in an attrition cell is a high solid content, i.e. a low water/materials ratio, so as to increase the number of rubbings between the solid particles, which in this third embodiment of the machine is obtained through the aforementioned slight inclination of drum 1. In fact, due to this inclination the water/materials ratio decreases proceeding towards the recovered materials exit as the water, at the same flow rate, stays less being provided with greater speed.

This gives the dual advantage of dragging more easily the organic contaminants which are separated in the end region of drum 1, after ring 10, and of producing in that region an action similar to that of an attrition cell, improving the wash of the recovered materials.

Figure 5:
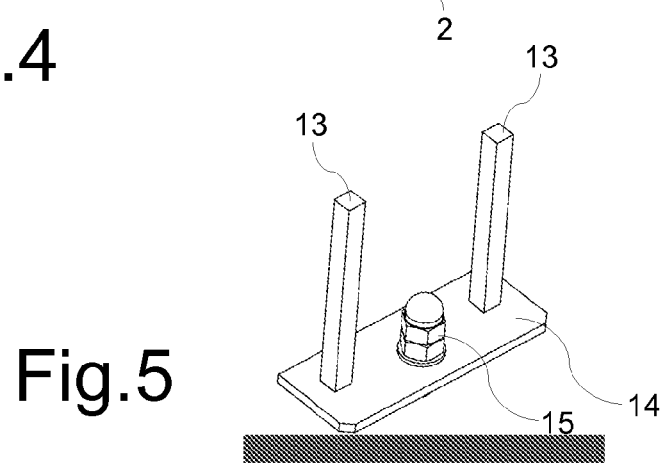
FIG. 5 is an enlarged perspective view of a type of clod-breaking teeth with which the machine can be provided.

Finally, in FIG. 5 there is shown an example of clod-breaking teeth with which drum 1 of the machine can be internally provided in a fourth embodiment (not illustrated). In the illustrated example two teeth 13 with a square section (substantially harrow teeth) are mounted on a common base plate 14 which in turn is mounted within drum 1 through a bolt 15 with a nut for adjusting the inclination, same as paddles 2. The base plate 14 can be rotated through 180° so as to swap the positions of the two teeth 13, this allowing to reduce their frequency of replacement. In fact since the upstream teeth is the one suffering the highest wear from the impact with the waste materials, once it is significantly worn out it can be replaced by the downstream teeth that is much less worn thus maintaining the effectiveness of the clod-breaking action of the teeth pair for another significant period of time prior to replacement.

It should also be noted that the number of teeth 13 on each base 14 as well as the total number of teeth 13 mounted in drum 1 can be freely varied depending on the type of materials to be treated.

It is therefore clear that the above-described and illustrated embodiments of the washer according to the invention are just examples susceptible of various modifications. In particular, the various innovative features described above (ring 10, nozzle 11, inclination of drum 1, teeth 13) can be variously combined to obtain other embodiments not explicitly mentioned in this application.

The invention claimed is:

1. A washer comprising:
   a horizontal rotary drum in which materials to be treated are adapted to be introduced through a feed hopper together with a water flow admitted through treatment nozzles so as to form a suspension of water and materials,
   inclined paddles arranged inside the drum, the inclined paddles configured to move forward heavy materials deposited on the bottom of the drum towards an exit end of the drum,
   an extractor and concentric screening means, the extractor connected to the drum at the exit end and configured to convey the heavy materials towards the concentric screening means,
   a first nozzle for admission of water for counter-current washing of the treated materials arranged just upstream of said extractor, and
   a stop member arranged transversally inside the drum so as to leave only a peripheral annular passage having a height lower than the level of the suspension of water and materials present on the bottom of the drum.

2. The washer according to claim 1, wherein the stop member is directly secured on some of the inclined paddles.

3. The washer according to claim 1, further comprising a second nozzle for the admission of water for the counter-current washing arranged just upstream from the stop member.

4. The washer according to claim 3, wherein the stop member is ring-shaped and the second nozzle is fed through a pipe that passes through the central opening of the stop member and is coaxial with the pipe that feeds the first nozzle for the admission of water for the counter-current washing.

5. The washer according to claim 3, wherein the second nozzle is inclined at about 45° and designed to emit a fan-shaped jet.

6. The washer according to claim 1, further comprising means for slightly inclining the axis of the rotary drum within a small angular range so as to achieve a maximum slope of 2%-3% in the direction towards the exit where the concentric screening means are located.

7. The washer according to claim 1, wherein the drum is internally provided with clod-breaking teeth.

8. The washer according to claim 7, wherein the clod-breaking teeth are mounted in pairs on a common base plate which is in turn mounted inside the drum through a bolt with a nut for adjustment of an inclination of the common base plate.

9. The washer according to claim 1, wherein the concentric screening means consist of three conical screens made from metal sheets provided with holes of decreasing size from the innermost to the outermost screen.

10. The washer according to claim 9, further comprising additional nozzles for washing the innermost screen and the outermost screen.

* * * * *